(12) United States Patent
Van Lierde et al.

(10) Patent No.: US 9,694,539 B2
(45) Date of Patent: Jul. 4, 2017

(54) ENDODONTIC TREATMENT SIMULATION SYSTEM

(75) Inventors: Carl Van Lierde, Meerbeke (BE); Veerle Pattijn, Kessel-Lo (BE); Paul-Henri Valloton, Pampigny (CH)

(73) Assignees: MAILLEFER INSTRUMENTS HOLDING SARL, Ballaigues (CH); DENTSPLY IMPLANTS NV, Hasselt (BE)

( * ) Notice: Subject to any disclaimer, the term of this patent is extended or adjusted under 35 U.S.C. 154(b) by 534 days.

(21) Appl. No.: 14/117,093

(22) PCT Filed: May 11, 2012

(86) PCT No.: PCT/EP2012/058714
§ 371 (c)(1),
(2), (4) Date: Nov. 12, 2013

(87) PCT Pub. No.: WO2012/156287
PCT Pub. Date: Nov. 22, 2012

(65) Prior Publication Data
US 2014/0228992 A1 Aug. 14, 2014

(30) Foreign Application Priority Data
May 13, 2011 (GB) .................... 1108003.3

(51) Int. Cl.
*B29C 67/00* (2006.01)
*G09B 23/28* (2006.01)
*B33Y 80/00* (2015.01)

(52) U.S. Cl.
CPC ........ *B29C 67/0051* (2013.01); *G09B 23/283* (2013.01); *B33Y 80/00* (2014.12)

(58) Field of Classification Search
CPC .................. B29C 67/0051; G09B 23/283
See application file for complete search history.

(56) References Cited

U.S. PATENT DOCUMENTS

| | | |
|---|---|---|
| 3,947,967 A | 4/1976 | Satake |
| 4,137,633 A | 2/1979 | Kahn |
| 5,503,562 A | 4/1996 | Mays |

(Continued)

FOREIGN PATENT DOCUMENTS

| | | | |
|---|---|---|---|
| BE | WO 2009133131 A1 * | 11/2009 | .............. A61C 11/00 |
| DE | 4100636 | 7/1992 | |

(Continued)

OTHER PUBLICATIONS

International Search Report dated Sep. 19, 2012, corresponding to PCT/EP2012/058714.

(Continued)

*Primary Examiner* — Ramesh Patel
(74) *Attorney, Agent, or Firm* — Young & Thompson

(57) ABSTRACT

A device for endodontic treatment simulation is described including: at least one physical tooth model including pulp chamber and root canals, manufactured by way of layered manufacturing or rapid prototyping techniques and corresponding to a real-life endodontic case. Methods and systems for designing and manufacturing the device are also described.

22 Claims, 7 Drawing Sheets
(2 of 7 Drawing Sheet(s) Filed in Color)

(56) References Cited

U.S. PATENT DOCUMENTS

| | | | | |
|---|---|---|---|---|
| 6,257,895 | B1* | 7/2001 | Oestreich | G09B 23/34 |
| | | | | 434/263 |
| 6,405,071 | B1* | 6/2002 | Analoui | A61B 6/14 |
| | | | | 128/922 |
| 6,520,775 | B2* | 2/2003 | Lee | G09B 23/283 |
| | | | | 434/262 |
| 6,524,105 | B2* | 2/2003 | Raffeiner | G09B 23/283 |
| | | | | 433/213 |
| 7,530,812 | B2* | 5/2009 | Chyz | G09B 23/283 |
| | | | | 434/263 |
| 8,454,362 | B2* | 6/2013 | Rubbert | A61C 8/0036 |
| | | | | 433/172 |
| 2005/0079470 | A1* | 4/2005 | Rutherford | A61O 5/04 |
| | | | | 433/226 |
| 2006/0008777 | A1* | 1/2006 | Peterson | A61C 13/0019 |
| | | | | 433/223 |
| 2006/0009540 | A1* | 1/2006 | Jia | A61K 6/0017 |
| | | | | 523/116 |
| 2008/0026353 | A1* | 1/2008 | Chyz | G09B 23/283 |
| | | | | 434/263 |
| 2009/0130638 | A1* | 5/2009 | Hof | A61O 5/023 |
| | | | | 433/224 |
| 2009/0148486 | A1* | 6/2009 | Lu | A61K 9/0063 |
| | | | | 424/422 |
| 2009/0239204 | A1* | 9/2009 | Kadobayashi | G09B 23/283 |
| | | | | 434/263 |
| 2009/0263774 | A1* | 10/2009 | Pichardo | G09B 23/286 |
| | | | | 434/263 |
| 2010/0330539 | A1* | 12/2010 | Glover | A61B 18/20 |
| | | | | 433/224 |
| 2011/0159451 | A1* | 6/2011 | Kuo | A61C 7/002 |
| | | | | 433/24 |
| 2011/0171607 | A1* | 7/2011 | Mao | A61O 5/04 |
| | | | | 433/224 |
| 2014/0302111 | A1* | 10/2014 | Mao | A61K 38/18 |
| | | | | 424/423 |

FOREIGN PATENT DOCUMENTS

| | | | | |
|---|---|---|---|---|
| IT | WO 2007108030 | A1* | 9/2007 | G09B 23/283 |
| JP | 11-85009 | | 3/1999 | |
| JP | 2002-224147 | | 8/2002 | |
| JP | 2004-348095 | | 12/2004 | |
| JP | 2020653 | A2* | 2/2009 | G09B 23/283 |
| JP | 2011-085614 | | 4/2011 | |
| JP | 5 241498 | | 7/2013 | |
| WO | 2007/108030 | | 9/2007 | |
| WO | 2008/008598 | | 1/2008 | |
| WO | WO 2008008598 | A3* | 11/2008 | G09B 23/283 |
| WO | 2009/133131 | | 11/2009 | |

OTHER PUBLICATIONS

N.K. Tolochko et al., "Dental root implants produced by the combined selective laser sintering/melting of titanium powders", Proc. Instn. Engrs., 2002, pp. 267-270, vol. 216, Part L: J Materials: Design and Applications.

Japanese Office Action dated May 25, 2016, with partial English Translation; Application No. 2014-509747.

Langnau, L. (Sep. 3, 2010). 3D models help improve oral surgery. Retrieved Jan. 25, 2017, from http://www.makepartsfast.com/3d-models-help-improve-oral-surgery/.

Dong J. et al., "Tool selection and path control for automated anterior teeth coronal canal treatment preparation", 2005 ASME International Mechanical Engineering Congress and Exposition, IMECE 2005, American Society of Mechanical Engineers, US; Orlando, FL, USA, (Jan. 1, 2005), vol. 16-1, ISBN 0-7918-4223-1, pp. 109 to 117.

* cited by examiner

ENDODONTIC TREATMENT SIMULATION SYSTEM

FIELD OF THE INVENTION

The present invention relates to methods, apparatus, tools, systems for endodontic treatment simulation as well as to software able to carry out such methods or to implement such apparatus, tools, or systems as well as non-transitory storage media storing the software.

BACKGROUND

Endodontic training blocks and tooth models are typically used for practicing endodontic treatments or for the development and evaluation of endodontic instruments for root canal treatment, in both cases as an alternative to the use of extracted teeth or cadaver teeth.

A typical root canal endodontic treatment starts by creating a suitable opening into the pulp chamber to allow access to the root canals in the floor of the pulp chamber. Secondly, the root canals are cleaned out with dedicated instruments ("files") which remove ailing pulp and dentin tissues and ream the root canals into a conical shape with a smooth and clean surface. After irrigation with a disinfection media, the root canals are sealed and obturated with a filling material.

This type of treatment holds several risks such as incomplete cleaning of the root canal, typically at the apical part of the canals; fracture of the root canal instruments (e.g. files) during reaming of the root canal or an incomplete filling of the root canal. Due to the complexity of this procedure, it is important that adequate root canal treatment simulation systems are available in order to allow dental trainees to practice on lifelike cases and/or to validate new root canal instruments on lifelike cases.

Currently existing tooth models have limitations with respect to mimicking lifelike cases, U.S. Pat. No. 3,947,967 refers to root canal models comprising a transparent plastic body with a cavity mimicking the pulp chamber and the root canal(s). The transparent body has at least one flat side in order to have an undistorted view of the root canal. U.S. Pat. No. 4,137,633 refers to a variation of above-mentioned root canal model providing a resilient mass at the apical part of the root canal cavity in order to simulate the tactile feedback when reaching the apical point of the root canal with an endodontic file. U.S. Pat. No. 5,503,562 refers to an improvement of the former root canal model, by configuring at least one side wall of the transparent body to optically magnify the root canal. This in order to augment the visual inspection of the cavity and the results of root canal treatments performed on the cavity. The above mentioned types of endodontic training blocks have limitations when it comes to representing the lifelike situation. First of all these blocks do not have a tooth like external shape, and therefore inherently do not allow for a realistic simulation of a root canal treatment, which starts with creating an opening in the occlusal surface of the tooth to access the pulp chamber and subsequently the root canal(s). Secondly, these endodontic training blocks are typically made by moulding or milling techniques making it virtually impossible to duplicate the complex shape of natural root canals, which is often a network of canals having irregular shapes and directions, including among others furcations, accessory (lateral) canals, or even partially calcified root canals.

Patent JP5241498 refers to an endodontic tooth model for treatment simulation, consisting of a dentinal part enclosing at least the pulp chamber and a cavity—optionally filled with a softer material—representing the pulp chamber and the root canal(s). US Patent US2009/0263774 A1 refers to an artificial tooth that simulates the anatomical features of natural teeth, such as the appearance and internal anatomy, and the physical properties, such as bone-like hardness, density and radio-opacity to provide for anatomically correct contrast during x-ray imaging. The two latter inventions do allow for simulating the complete root canal treatment, starting with the creation of the access cavity to the pulp chamber. However, the degree at which the complex shape of natural root canals can be mimicked is poor due to the conventional production method i.e. moulding. Complex clinical cases (C shaped canals, lateral root canals, fractured teeth, etc.) can therefore not be produced, while being highly relevant for the training of dental professionals and the evaluation of new instruments.

Another drawback of the existing endodontic treatment simulation systems such as commercially available tooth models is the fact that there is no easy way to compare the performed treatment with an optimized treatment. This feedback would be very beneficial to the dental trainee in order to improve his/her endodontic treatment techniques. Patent application WO 2007/108030 A1 refers to an endodontic training device that comprises an enclosing housing for a tooth and allows for x-ray imaging.

As such, multiple radiographs can be taken from the tooth, prior, during or after the root canal treatment in order to rapidly evaluate the treatment sequence. This device does not allow the comparison with a predetermined ideal root canal preparation in 3D. In contrast, the dental trainee can only incrementally monitor the progress of the root canal treatment in one or more planar views, but is not provided with the ability to assess to what extent the realized preparation conforms to a desired or acceptable preparation in three dimensions.

Patent DE4100636 (A1) describes the manufacturing of a root-shaped dental implant by copy milling from an impression formed in the root area of an extracted natural tooth or in the artificial tooth socket of a taken impression.

In the prior art ("Dental Root Implants Produced by the Combined Selective Laser Sintering/Melting of Titanium Powders", N K Tolochko, V V Savich, L Froyen, G Onofrio, E Signorelli and V I Titov, Proc Instn Mech Engrs, Part L: J Materials: Design and Applications, Vol 216, No 4, 2002, pp 267-270) the manufacturing of dental root implants that almost correspond to natural dental roots in their geometrical, structural and mechanical characteristics by a combined process of selective laser sintering (SLS) and selective laser melting (SLM) of Titanium powders is described. Using these methods (SLS and SLM), it is possible to manufacture implants with a graded structure, i.e. a relatively high porosity at the surface and a high density in the core. However these root shaped implants do not have an internal, structure mimicking the pulp chamber and the root canal(s).

SUMMARY OF THE INVENTION

It is the object of the current invention to provide an endodontic treatment simulation system or method or tools therefor to be used for practical root canal treatment training or in the development and evaluation of new endodontic instruments.

In at least some embodiments the present invention seek to reduce or overcome at least one of the problems of the prior art systems and devices.

According to an embodiment of the present invention one or more endodontic tooth models are provided with an anatomical shape including crown, roots and the internal pulp chamber and root canals mimicking the complex geometry of the pulp chamber and the root canals corresponding to one or more different clinical cases of varying complexity. According to this embodiment of the invention the required level of realistic modelling is realized by building up the tooth model layer by layer using layered manufacturing or rapid prototyping techniques.

It is a feature of the present invention that the material(s) used is (are) optimized to mimic the natural tooth material, in order to have a lifelike tactile feedback when reaming the root canals using endodontic files.

It is another feature of the present invention that the endodontic tooth model(s) have is root canals that can be filled with another material, thereby mimicking the root canals' structure with respect to physical characteristics or to be used as visual feedback for validating the completeness of the endodontic cleaning and shaping process.

It is another feature of the invention that 3D image data (e.g. CT, MRI, ultrasound images or the like) of the clinical case corresponding to the tooth models, i.e. the natural tooth on which the tooth models are based, are available as part of the system.

Yet another feature of the invention is that the ideal root canal preparation for every tooth model in the system has been established and documented. The latter can for example be achieved by volumetric imaging of the ideally prepared tooth. Alternatively the ideal preparation is documented by histological sections according to known slices along a predefined tooth axis.

Information about the ideal preparation may be incorporated into the system to provide feedback about the quality of the preparation to the dental trainee during or subsequent to the treatment simulation. In one example, the said information is incorporated in the system as colours in the tooth model, providing visual feedback. The untreated internal pulp chamber and root canal(s) are thereby manufactured in a certain colour. Another colour is then used to indicate the shell of material that must be removed during the root canal shaping to comply with the ideal preparation. This way the dental trainee has a visual indication of the adequacy of the treatment, either during the treatment itself (removal of coloured particles) or after the treatment. In the latter case it will be necessary to section the tooth model to assess the adequacy of the performed treatment simulation with respect to the predefined ideal one. It is also possible to increase the number of colours to allow the marking of more areas. It could for instance be useful to mark with another colour the volume between the boundary of the ideal treatment and the boundary zone outside which the risk of fenestration becomes significant.

According to another example, information about the ideal preparation is incorporated into the system by software visualizing the simulated tooth (root) treatment in 2D sections or in 3D (subsequent to imaging) relative to the 2D sections or 3D of the ideal preparation. The visualization may include a qualitative and/or quantitative illustration of the respective differences. Images of the tooth model subsequent to the simulated root canal treatment can be obtained by different imaging techniques like for instance (CB) CT or µCT.

The software application may also be used for comparing the root canal geometry during successive steps in the simulated treatment or to compare the initial geometry of the root canals to the geometry at an intermediate state of treatment. The imaging equipment necessary to capture the internal and external geometric information of the tooth model on which the treatment has been simulated, is not required to be a part of the system according to the current invention but can optionally be part of it. The present invention also includes non-transitory storage media storing any of the software.

A significant advantage of embodiments of the current invention is that the dental professional is provided with a feedback relative to the adequacy of the performed treatment simulation. The feedback is direct and does not require a separate evaluation by a trainer or a more experienced practitioner.

It is another advantage of embodiments of the current invention to allow feasibility testing of root canal treatment in complex anatomical cases that would normally require a tooth extraction. An additional advantage of embodiments of the present invention is that the same case can be simulated more than once, potentially by different people, to evaluate the variability among operators of the endodontic instruments.

Yet another significant advantage embodiments of the present invention is that the evaluation of the adequacy of the simulated treatment can be performed also directly in 3D.

The patent or application file contains at least one drawing executed in color. Copies of this patent or patent application publication with color drawing(s) will be provided by the Office upon request and payment of the necessary fee.

DESCRIPTION OF PREFERRED EMBODIMENTS

The present invention will be described with respect to particular embodiments and with reference to certain drawings but the invention is not limited thereto but only by the claims.

Figure 10:
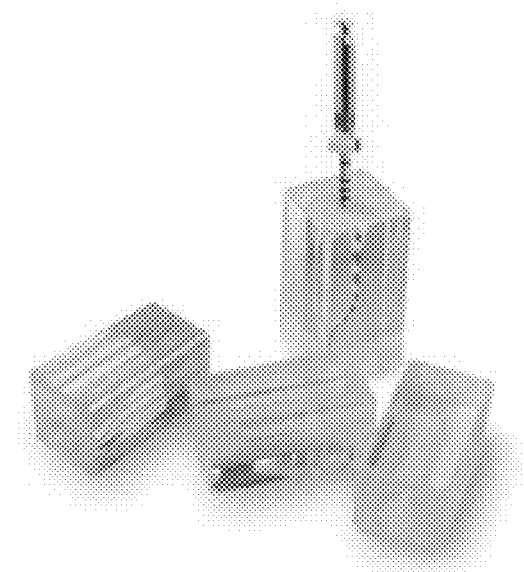
FIG. 10 shows a typical commercially available endodontic training block.

The FIG. 10 shows a typical commercially available endodontic training block.

Figure 6:
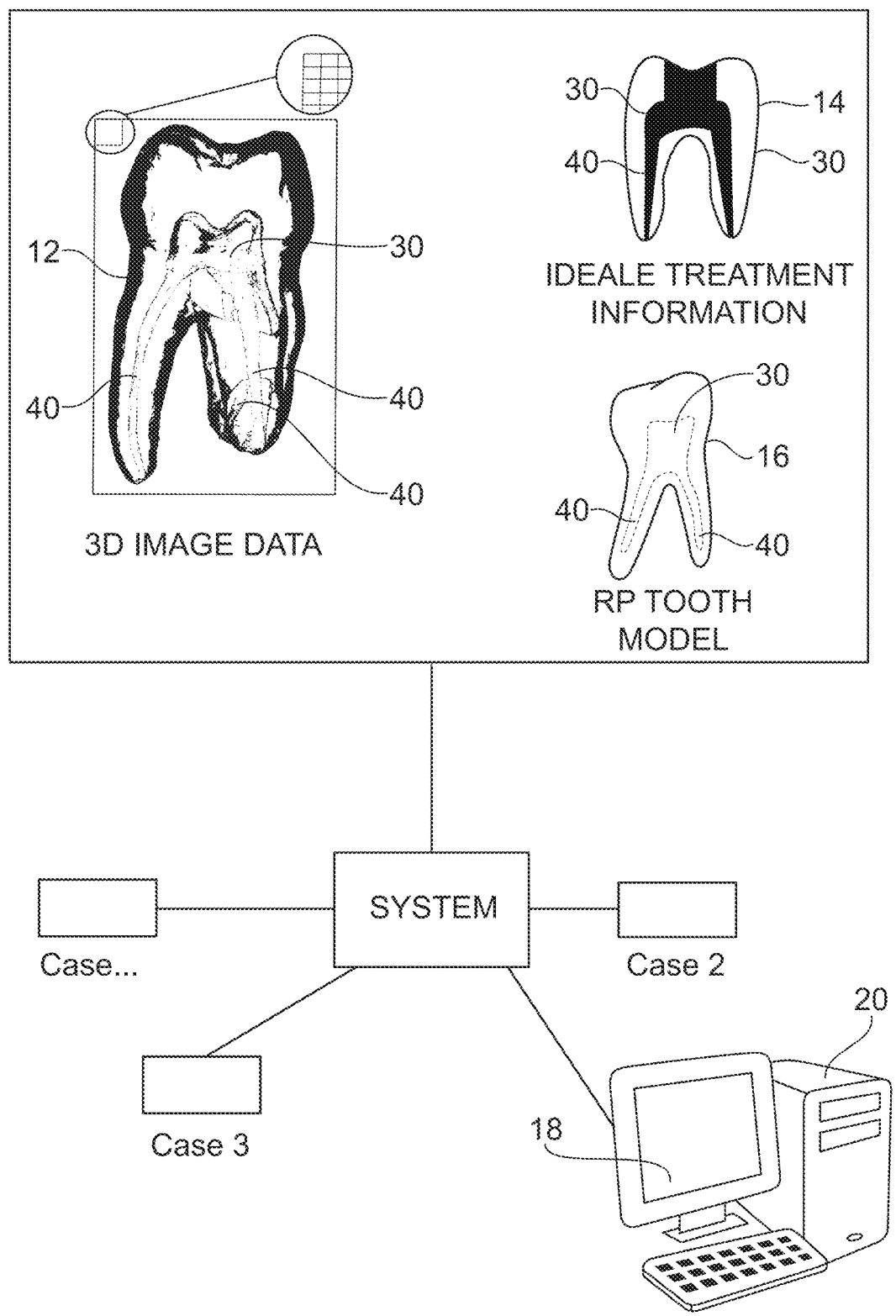
FIG. 6 is a schematic representation of a system in accordance with an embodiment of the present invention.

Embodiments of the present invention relate to a root canal treatment simulation system comprising in one or more physical tooth models. FIG. 6 shows a schematic overview of the system 10. Several patient or lifelike cases 1 to 3 or more can be part of the system 10. The system 10 is a computer based system comprising a computer or computer network 20 as well as a display 18. Optionally, the system can also include a digitizer that digitizes the tooth model after simulation of the treatment has been performed.

Embodiments of the present invention provide a device for use in endodontic treatment simulation, the device comprising at least one physical tooth model 16 including pulp chamber 30 and root canals 40, manufactured by layered or rapid prototyping techniques and corresponding to a real-life endodontic case. 3D image data 12 of the endodontic case is obtained and used to which the tooth model corresponds. In addition a desired or ideal endodontic treatment plan 14 is available of said real life endodontic case.

Figure 1:
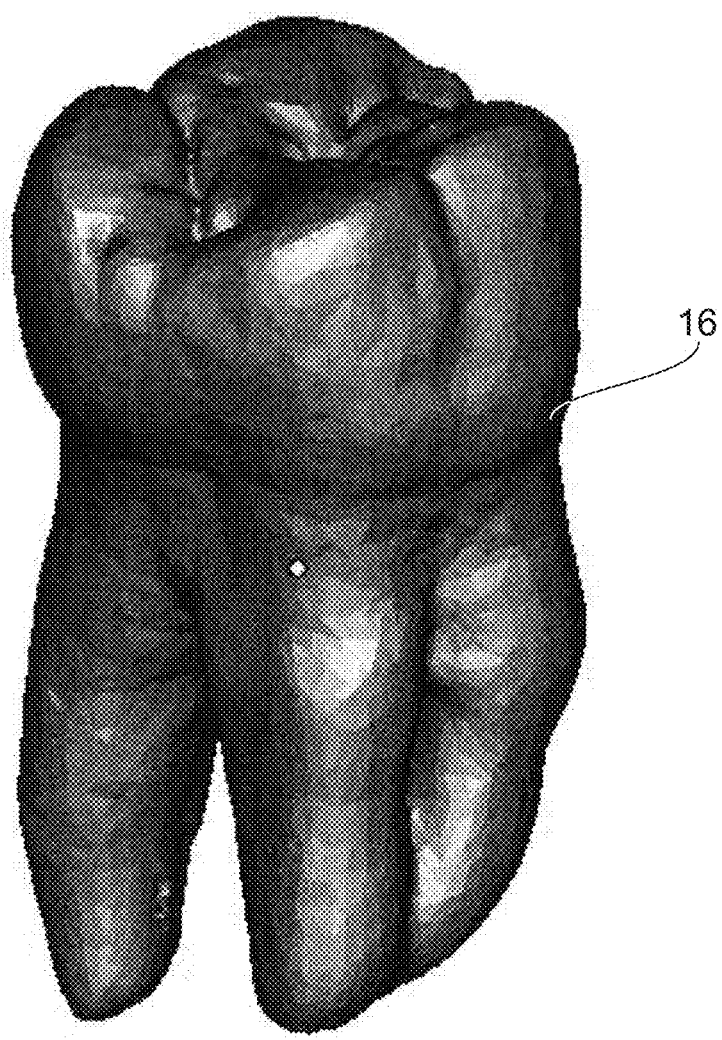
FIG. 1 shows an image of a displayed tooth model.
Figure 2:
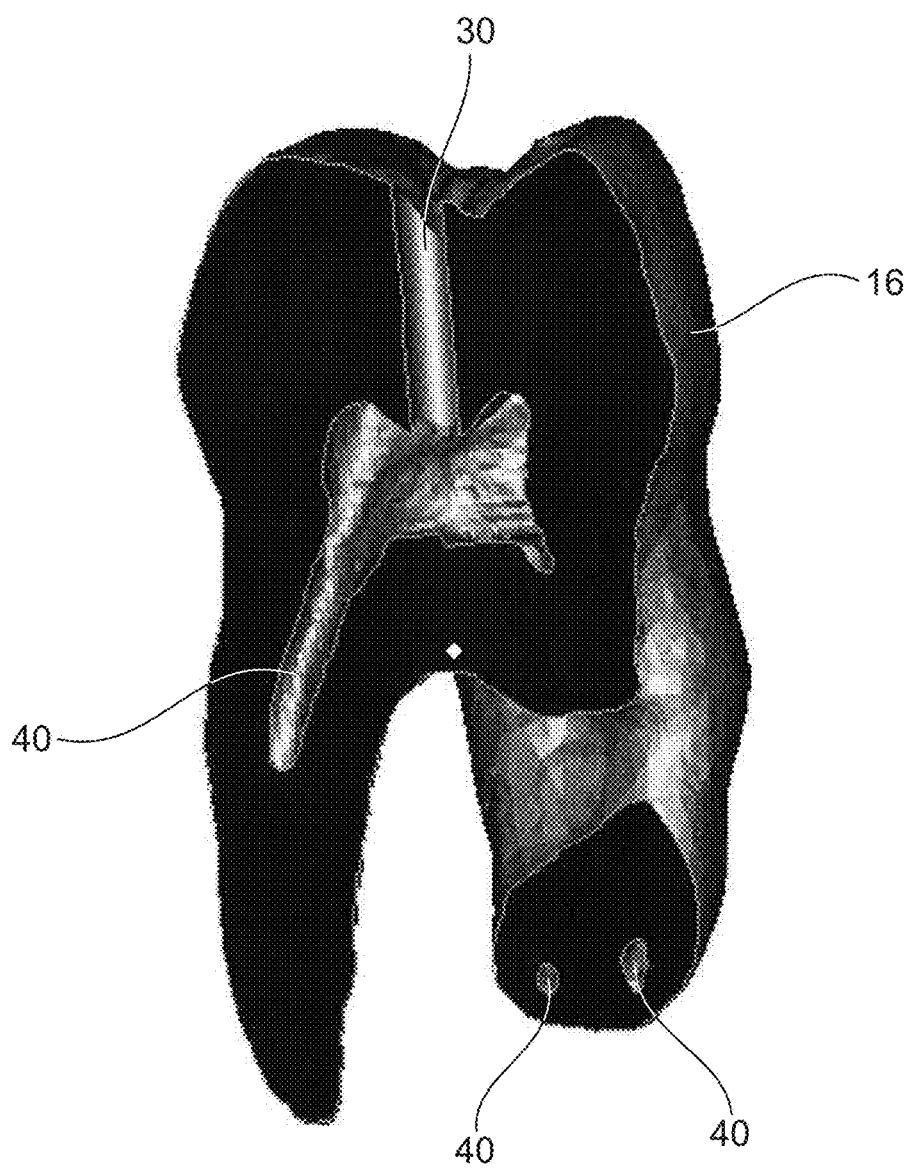
FIG. 2 shows across section of the same model as shown in FIG. 1 showing the pulp chamber and the root canals.
Figure 5:
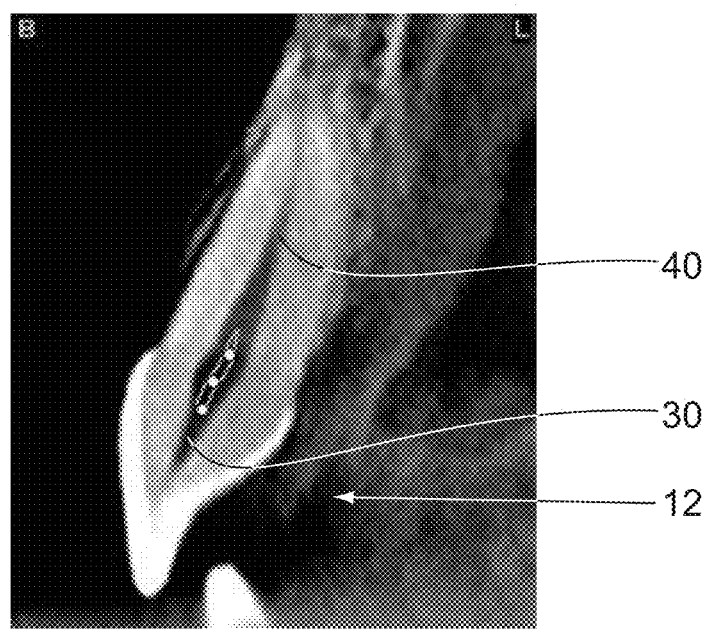
FIG. 5 shows a medical image data of a real life case.

According to a preferred minimal embodiment of the invention a root canal treatment simulation system comprises one or more physical tooth models 16 corresponding to one or more typical real-life endodontic cases of varying complexity (see FIG. 1 for the model and FIG. 5 for a real life case). For the design of the tooth models a 3D computer model of a natural tooth (extracted tooth or cadaver tooth) including the pulp chamber and the root canals is obtained by µCT imaging or any other imaging technology with adequate resolution (see FIG. 2). Adequate resolution corresponds with sufficiently high resolution in order to visualize the root canals. The resulting 2D slice images are processed (segmentation and surface reconstruction) in order to create a 3D surface model of the tooth including a cavity representing the pulp chamber and the root canals but with the natural complex 3D shape and size.

Figure 3:
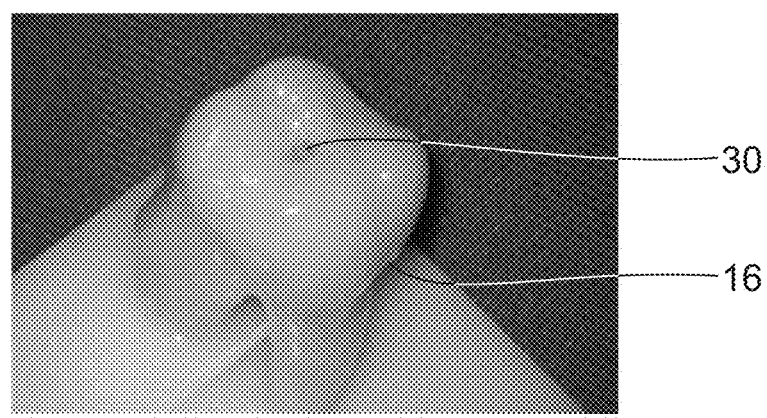
FIG. 3 shows a rapid prototyped tooth model in accordance with an embodiment of the present invention.
Figure 4:
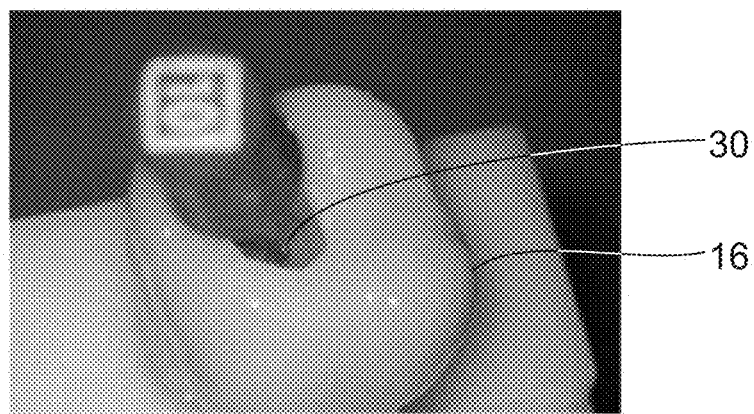
FIG. 4 shows a simulation of endodontic intervention on the rapid prototyped tooth model of FIG. 3.
Figure 7:
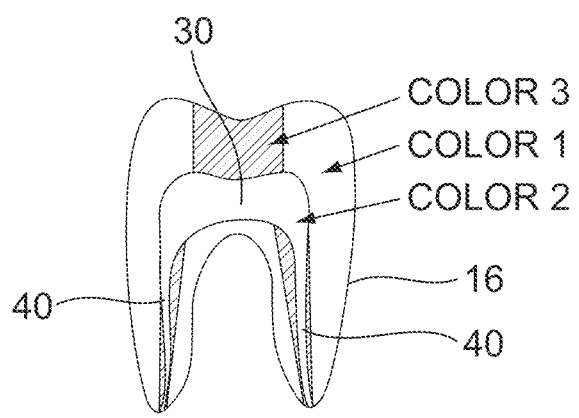
FIG. 7 shows a cross-section through a physical model in accordance with an embodiment of the present invention.

The achieved 3D design of the tooth model is used for manufacturing the physical tooth models by a layered manufacturing technique or by any suitable rapid prototyping technique such as stereolithography, selective laser sintering, fused deposition modelling, wax plotting, selective laser melting and the like (see FIG. 3). The respective pulp chambers and the root canals are present in the tooth models as cavities or as structures with different material properties (see FIG. 4). FIG. 7 shows a schematic cross section through the manufactured Rapid Prototyped tooth model. Different colors are used to provide visual indicators. For example color 3 is used to give visual feedback to the user about the ideal preparation.

The advantage of using layered manufacture or rapid prototyping technology is the possibility to produce very complex internal structures which are typically not possible to manufacture by conventional techniques such as milling or moulding. In a first implementation of this embodiment, the tooth models may be produced in a transparent material. Alternatively, opaque materials can be used providing an endodontic tooth model with lifelike physical properties or lifelike radio-opacity. This method of manufacturing (i.e. rapid prototyping) of said endodontic tooth models has the advantage that any lifelike case, irrespective of its complexity, can be copied, as long as adequate images of the original natural tooth are available.

According to another preferred embodiment the above-described process can start from any 3D computerized model of a tooth with internal cavity, and is not limited to start from a 3D computer model of a tooth obtained by a high-resolution scan of a natural tooth. The 3D tooth model can be generated by any CAD software by free hand drawing, or can be generated based on statistical information of natural teeth, or can result from adapting the 3D model obtained from scanning a natural tooth (e.g. applying a scale factor, filling root canals for simulating partly calcified canals . . . ).

According to another preferred embodiment of the invention, a rapid prototyping process is selected which is capable of manufacturing the endodontic tooth model using multiple materials and/or colours. As such it is possible to differentiate clinically relevant areas with different materials/colours allowing easy visual and/or tactile feedback about the endodontic treatment, either directly during or indirectly after the simulated treatment. Accordingly the endodontic tooth model may have a material mimicking the nerve structures and pulp inside the pulp chamber and the root canal(s). Another approach could be to use a filling technique for inserting material into the cavity of the tooth model subsequent to its manufacturing by rapid prototyping.

According to another preferred embodiment of the invention, the root canal treatment simulation system consists in the above-mentioned endodontic tooth model(s) combined with one or more of the following components: (i) 3D image data (e.g. µCT scans, MRI scans, CAD models or the like) of said models, (ii) information about the optimal treatment e.g. in the form of a 3D model of the treated canals and (iii) software for visualizing the untreated and/or treated tooth model either in 3D and/or in 2D sectional images for the assessment of treatment quality. The latter software may also include functionality such as advanced measuring tools for quantifying the differences between the optimal treatment as defined by the system and the actually realized simulated treatment on the tooth model.

Figure 8:
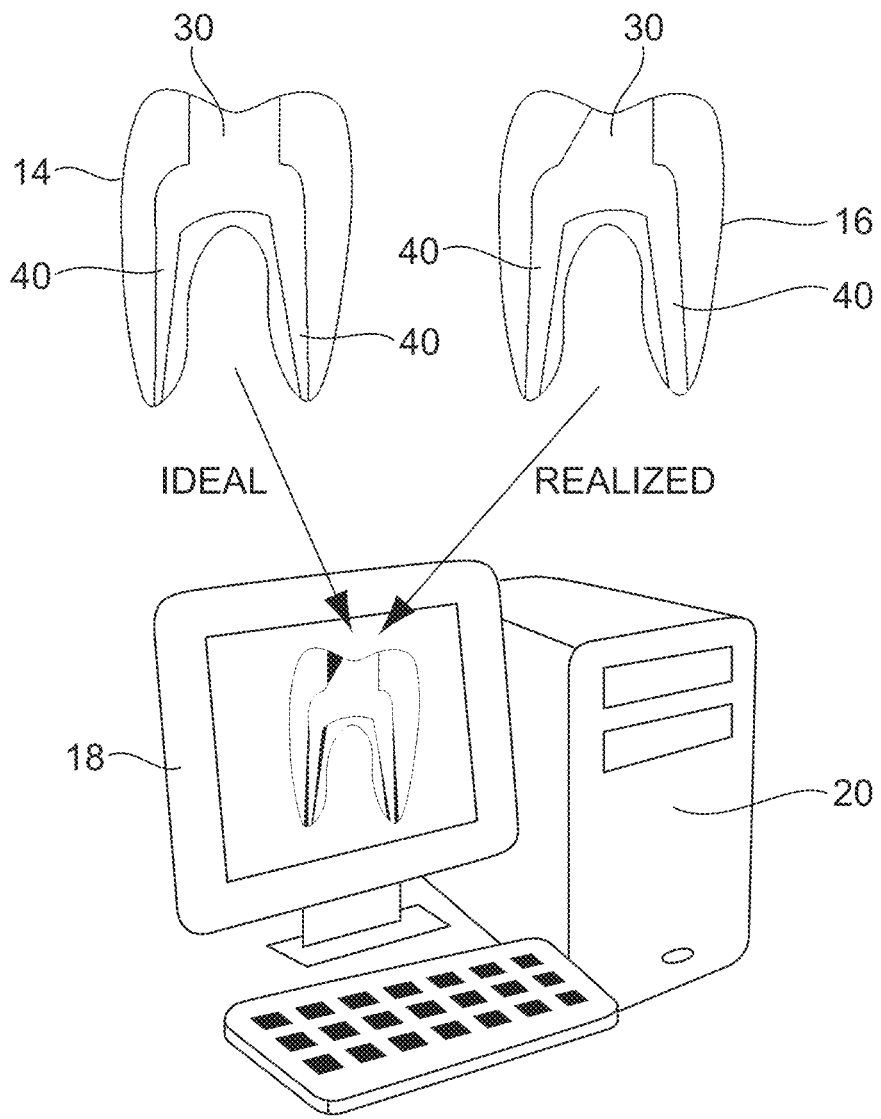
FIG. 8 shows schematically the system according to an embodiment of the present invention adapted to show a relative comparison between the ideal tooth preparation and the preparation made during the simulation of the treatment on the tooth model.

FIG. 8 shows schematically how the system (e.g. as implemented in software running on a processor with memory) allows for a relative comparison (delta) between the ideal tooth preparation 14 and the preparation made during the simulation of the treatment on the tooth model 16. The comparison can be made on the computer or computer network 20 and displayed on the display 18.

For the comparison of different image sets of the tooth model taking prior, during or after root canal treatment, the software must allow registration of the different image sets of the same tooth model and easy visualization of the differences between these image sets.

Different approaches are possible for registration, with a varying degree of automation. For example, a manual registration process requiring as input pairs of corresponding points. Said points are entered by the user for instance by mouse selection on the tooth models. Optionally this manual registration process can be extended with an automatic surface or volume registration algorithm to increase the accuracy of the registration process. Alternatively markers can be included in the tooth model to be used for the registration process. These markers can either be radio-opaque markers included inside the tooth model or a base plate added to the tooth model or physical features included for instance in a base plate added to the tooth model that are easily recognizable within the images. Irrespective of the method used for registration, it is important that the accuracy of said registration is high in order to be able to correctly visualize the differences between the image sets.

In order to visualize the differences between both sets of images, several approaches are possible. According to one approach a 3D surface model is generated for each image set and the thereby obtained 3D models are visualized together using semi-transparency for showing the differences. In another approach the distance from one surface model to the other is calculated and visualized on the surface by a colour code. In yet another approach the 3D models could be sliced perpendicular to a certain direction (either user-defined or automatically determined) and the contours within these slices are calculated and visualized by different colours. These different visualization techniques can be combined in any possible way or can be applied only on the 3D models of the internal structures i.e. pulp chamber and root canals or the prepared cavity after treatment.

Figure 9:
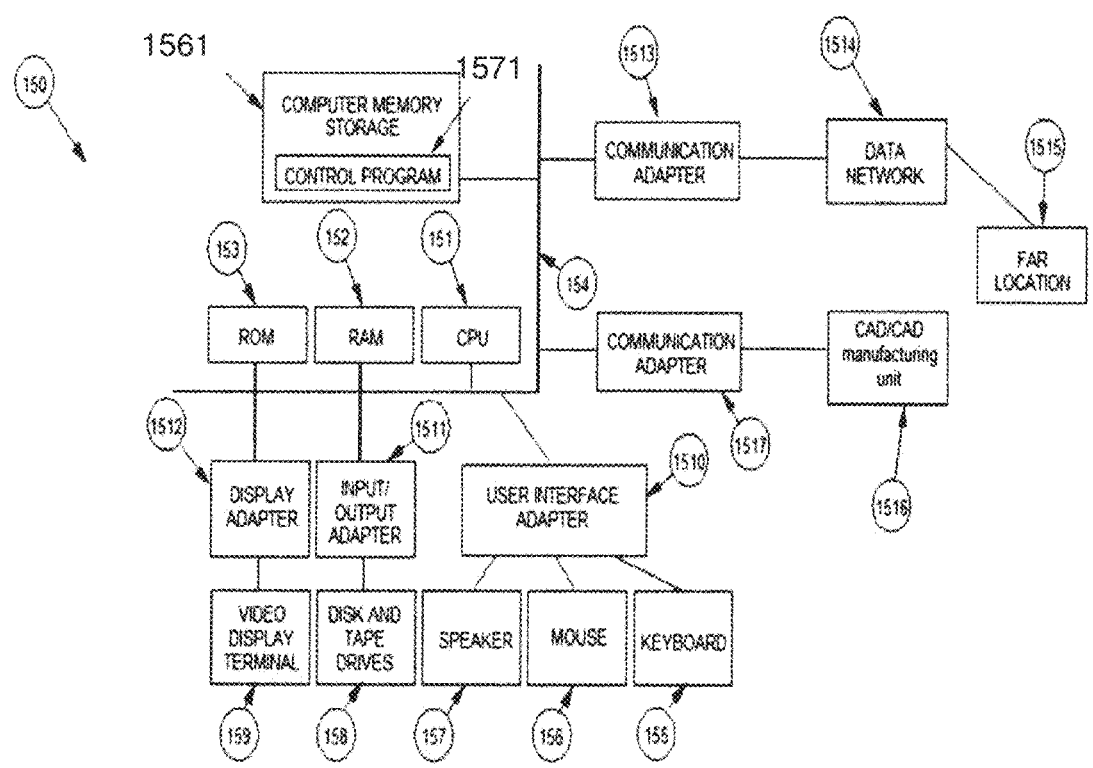
FIG. 9 is a schematic representation of a computer system that can be used with the present invention.

FIG. 9 is a schematic representation of a computing system which can be utilized with the methods and in a system according to the present invention including computer programs such as 3-Matic™ as supplied by Materialise N.V., Leuven, Belgium. A computer 150 is depicted which may include a video display terminal 159, a data input device such as a keyboard 155, and a graphic user interface indicating device such as a mouse 156. Computer 150 may be implemented as a general purpose computer, e.g. a UNIX workstation or a personal computer.

Computer 150 includes a Central Processing Unit ("CPU") 151, such as a conventional microprocessor of which a Pentium processor supplied by Intel Corp. USA is only an example, and a number of other units interconnected via bus system 154. The bus system 154 may be any suitable bus system the above figure is only schematic. The computer 150 includes at least one memory. Memory may include any of a variety of data storage devices known to the skilled person such as random-access memory ("RAM"), read-only memory ("ROM"), and non-volatile read/write memory such as a hard disc as known to the skilled person. For example, computer 150 may further include random-access memory ("RAM") 152, read-only memory ("ROM") 153, as well as a display adapter 1512 for connecting system bus 154 to a video display terminal 159, and an optional input/output (I/O) adapter 1511 for connecting peripheral devices (e.g., disk and tape drives 158) to system bus 154. Video display terminal 159 can be the visual output of computer 150, which can be any suitable display device such as a CRT-based video display well-known in the art of computer hardware. However, with a desk-top computer, a portable or a notebook-based computer, video display terminal 159 can be replaced with a LCD-based or a gas plasma-based flat panel display. Other forms of display can be glasses worn during the endodontic treatment or simulation. Computer 150 further includes user interface adapter 1510 for is connecting a keyboard 155, mouse 156, and optional speaker 157. The relevant data describing the 3-D model may be input directly into the computer using the keyboard 155 or from storage devices such as 158, after which a processor carries out a method in accordance with the present invention. Any of the results of the method may be transmitted to a further near or remote location, e.g. a printing or CAD/CAM processing facility to manufacture a physical model of the tooth (as described above) in accordance with the details provided by computer 150.

A printing system or CAD/CAM manufacturing unit 1516 may also be connected via a communications adapter 1517 to bus 154 connecting computer 150 to a data network such as the Internet, an Intranet a Local or Wide Area network (LAN or WAN) or a CAN. The manufacturing unit 1516 may receive a descriptor file suitable for the manufacture of a physical model (as described above), directly from computer 150 running a computer program for establishing the shape of the physical model to be used in endodontic treatment or simulation in accordance with the present invention or a value or descriptor file derived from such an output of computer 150. Alternatively, the unit 1516 may receive the relevant design data indirectly on a suitable signal storage medium such as a diskette, a replaceable hard disc, an optical storage device such as a CD-ROM or DVDROM, a magnetic tape or similar.

Computer 150 also includes a graphical user interface that resides within machine-readable media to direct the operation of computer 150. Any suitable machine-readable media may retain the graphical user interface, such as a random access memory (RAM) 152, a read-only memory (ROM) 153, a magnetic diskette, magnetic tape, or optical disk (the last three being located in disk and tape drives 158). Any suitable operating system and associated graphical user interface e.g., Microsoft Windows, Linux) may direct CPU 151. In addition, computer 150 includes a control program 1517 that resides within computer memory storage 1561. Control program 1571 contains instructions that when executed on CPU 151 allow the computer 150 to carry out the operations described with respect to any of the methods of the present invention.

The computer 150 may be used in a computer based method for 3D digital endodontics and simulation, 3D imaging equipment being used to digitize an image of an infected tooth or teeth to thereby form image data. The 3D imaging equipment is for generation of volumetric data such as a CT scanner, an MRI scanner, or an ultrasound scanner.

The user interface is preferably adapted to extract the shape of the occlusal access cavity from the image data and visualized on a visual display unit. The user interface is preferably adapted to allow 3D and cross-sectional views of the root canal on coronal, sagittal and/or transverse plans.

Those skilled in the art will appreciate that the hardware represented in FIG. 9 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 6, the computer program product for carrying out the method of the present invention can reside in any suitable memory. However, it is important that while the present invention has been, and will continue to be, that those skilled in the art will appreciate that the mechanisms of the present invention are capable of being distributed as a computer program product in a variety of forms, and that the present invention applies equally regardless of the particular type of signal bearing media used to actually carry out the distribution. Examples of computer readable signal bearing media include: recordable type media such as floppy disks and CD ROMs, solid state memories, tape storage devices, magnetic disks.

Accordingly, the present invention also includes a software product which when executed on a suitable computing device carries out any of the methods of the present invention. Suitable software can be obtained by programming in a suitable high level language such as C and compiling on a suitable compiler for the target computer processor. The present invention includes software for endodontic treatment simulation comprising code segments that when executed on a processing engine, e.g. an engine comprising a target processor provide at least one physical tooth model including pulp chamber and root canals. The software may be adapted to allow manufacturing by layered manufacturing or rapid prototyping techniques and corresponding to a real-life endodontic case. The software may be adapted to allow manufacture of the physical tooth model provided with an anatomical shape including crown, roots and the internal pulp chamber and root canals mimicking the complex geometry of the pulp chamber and the root canals. The software may be adapted so that the manufactured physical tooth model has a visual indication of the adequacy of the treatment. The indication may provided by colours in the physical tooth model, providing visual feedback and the software may be adapted to allow such colours.

The software may be adapted so that the physical tooth model is manufactured with a first material and one or more root canals are filled with a second material, thereby mimicking the root canals' structure with respect to physical characteristics or to be used as visual feedback for validating the completeness of the endodontic cleaning and shaping process.

The software may be adapted so that the untreated internal pulp chamber and root canal of the physical model can be set to be manufactured in a colour, the shell of material that must be removed in the endodontic treatment during the root canal shaping is manufactured in another colour. The software may be adapted to allow the use of 3D image data of the real-life endodontic case to which the tooth model corresponds. The software may be adapted to make use of an ideal endodontic treatment plan is available of said real life endodontic case.

The software may be adapted to work with any of or any combination of (i) 3D image data of said models, (ii) information about the optimal treatment e.g. in the form of a 3D model, of the treated canals and (iii) software for visualizing the untreated and/or treated tooth model either in 3D and/or in 2D sectional images for the assessment of treatment quality. The 3D image data can be any one or more of μCT scans, MRI scans, CAD models.

The invention claimed is:

1. A device for endodontic treatment simulation comprising:
    at least one physical tooth model including a pulp chamber and root canals, the at least one physical tooth model being configured so that an endodontic treatment simulation is able to be implemented on the tooth model, manufactured by layered manufacturing or rapid prototyping techniques, including a series of layers parallel to each other and corresponding to a real-life endodontic case for which an endodontic treatment is to be simulated on the tooth model.

2. The device of claim 1, wherein the physical tooth model is provided with an anatomical shape including a crown, roots, and an internal pulp chamber and root canals mimicking the complex geometry of the pulp chamber and the root canals.

3. The device of claim 1, wherein the physical tooth model has a visual indication of the adequacy of the treatment.

4. The device of claim 3, wherein the indication is provided by colors in the physical tooth model, providing visual feedback.

5. The device of claim 1, wherein the physical tooth model is manufactured with a first material and one or more root canals are filled with a second material, thereby mimicking the structure of the root canals with respect to physical characteristics or to be used as visual feedback for validating the completeness of an endodontic cleaning and shaping process.

6. The device of claim 1, wherein the pulp chamber that is untreated and internal and the root canal of the physical model is manufactured in a color, and
    a shell of material is provided that is configured to be removed in the endodontic treatment during root canal shaping is manufactured in another color.

7. The device according to claim 1, further comprising three-dimensional (3D) image data of the real-life endodontic case to which the tooth model corresponds.

8. The device according to claim 1 wherein an ideal endodontic treatment plan is available for said real life endodontic case.

9. The device of claim 1, further comprising one or more of the following components: (i) three-dimensional (3D) image data of said at least one tooth model, (ii) information about an optimal treatment, and (iii) software for visualizing the at least one tooth model in an untreated and/or treated state either in 3D and/or in two-dimensional (2D) sectional images for an assessment of treatment quality.

10. The device of claim 9, wherein the 3D image data is one or more of μCT scans, MRI scans, CAD models.

11. A system for manufacturing a device according to claim 1, the system comprising:
    a computer network; and
    a layered manufacturing or rapid prototyping facility,
        wherein the computer network and the layered manufacturing or rapid prototyping facility produce the device.

12. The system of claim 11, wherein information about an ideal preparation is incorporated into the system by software visualizing the tooth treatment simulation in two-dimensional (2D) sections or in three-dimensions (3D) relative to the 2D sections or 3D of the ideal preparation.

13. The system of claim 12, wherein the simulated tooth treatment is a simulated tooth root treatment.

14. The system of claim 11, wherein the visualization includes a qualitative and/or quantitative illustration of the respective differences.

15. The system of claim 11, wherein images of the tooth model subsequent to the treatment simulation are obtained from different imaging techniques.

16. The system of claim 11, wherein the system is configured to compare root canal geometry during successive steps in the treatment simulation or to compare the initial geometry of the root canals to the root canal geometry at an intermediate state of treatment.

17. A method of making a device for endodontic treatment simulation, the method comprising:
    generating at least one physical tooth model including a pulp chamber and root canals, the at least one physical tooth model being configured so that an endodontic treatment simulation is able to be implemented on the tooth model, the at least one physical tool model being manufactured by a layered manufacturing or rapid prototyping techniques, including a series of layers parallel to each other and corresponding to a real-life endodontic case for which an endodontic treatment is to be simulated on the tooth model.

18. The method according to claim 17, further comprising providing three-dimensional (3D) image data of the real-life endodontic case to which the tooth model corresponds.

19. The method according to claim 17, wherein an ideal endodontic treatment plan is available for said real life endodontic case.

20. The method of claim 17, further comprising generating one or more of (i) three-dimensional (3D) image data of said models, (ii) information about an optimal treatment, and (iii) a visualization of an untreated and/or treated tooth model either in 3D and/or in two-dimensional (2D) sectional images for the assessment of treatment quality.

21. A computer program product for implementing the method according to claim 17.

22. A non-transitory machine readable storage medium storing the computer program product of claim 21.

* * * * *